United States Patent
Adamczyk et al.

(10) Patent No.: US 9,859,807 B2
(45) Date of Patent: Jan. 2, 2018

(54) POWER TRANSMISSION NETWORK

(71) Applicant: General Electric Technology GmbH, Baden (CH)

(72) Inventors: Andrzej Adamczyk, Staffordshire (GB); Carl David Barker, Staffordshire (GB)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 0 days.

(21) Appl. No.: 15/032,599

(22) PCT Filed: Oct. 28, 2014

(86) PCT No.: PCT/EP2014/073155
§ 371 (c)(1),
(2) Date: Apr. 27, 2016

(87) PCT Pub. No.: WO2015/063109
PCT Pub. Date: May 7, 2015

(65) Prior Publication Data
US 2016/0276948 A1 Sep. 22, 2016

(30) Foreign Application Priority Data
Oct. 29, 2013 (EP) .................................. 13275268

(51) Int. Cl.
*H02M 5/44* (2006.01)
*H02J 1/02* (2006.01)
(Continued)

(52) U.S. Cl.
CPC ................. *H02M 5/44* (2013.01); *H02J 1/02* (2013.01); *H02J 3/36* (2013.01); *H02M 7/7575* (2013.01); *Y02E 60/60* (2013.01)

(58) Field of Classification Search
CPC .... H02J 1/02; H02J 3/36; H02M 5/44; H02M 7/7575
(Continued)

(56) References Cited

U.S. PATENT DOCUMENTS 9,133,825 B2* 9/2015 Andresen .................. H02J 3/24
2010/0109447 A1* 5/2010 Achilles ................ F03D 7/0284
307/153
(Continued)

FOREIGN PATENT DOCUMENTS

CN 102545248 A 7/2012
WO WO 1997/35374 9/1997
(Continued)

OTHER PUBLICATIONS

Nguyen, et al., "Power Sharing Method for a Grid connected Microgrid with Multiple Distributed Generators," Journal of Electrical Engineering & Technology, vol. 7, No. 4, pp. 459-467 (Jul. 1, 2012).
(Continued)

Primary Examiner — Kyle J Moody
(74) Attorney, Agent, or Firm — GE Global Patent Operation; Scott R. Stanley

(57) ABSTRACT

A power transmission network includes a plurality of converters. Each converter includes first and second electrical terminals, each first electrical terminal being connectable to an electrical network, each second electrical terminal being operatively connected to at least one other second electrical terminal. A first converter includes a first controller, the first controller configured to selectively operate the first converter to modulate a power flow at its first or second electrical terminal, and a second converter includes a second controller, the second controller being configured to selectively operate the second converter to modulate a power flow at its second electrical terminal to generate a power to compensate for an imbalance in power within the power
(Continued)

transmission network caused by the modulation of power flow by the first converter, and thereby inhibit the modulation of power flow by the first converter from modifying a power flow in a third converter.

15 Claims, 4 Drawing Sheets

(51) Int. Cl.
*H02J 3/36* (2006.01)
*H02M 7/757* (2006.01)

(58) Field of Classification Search
USPC ...................................................... 363/35, 37
See application file for complete search history.

(56) References Cited

U.S. PATENT DOCUMENTS

2011/0109085 A1* 5/2011 Nelson ...................... H02J 3/24
290/44

2013/0175871 A1* 7/2013 Knuppel ................... H02J 3/24
307/102
2013/0257166 A1 10/2013 Gesong et al.
2016/0197558 A1* 7/2016 Whitehouse .......... H02M 7/483
363/35

FOREIGN PATENT DOCUMENTS

| WO | WO 2012/041527 A1 | 4/2012 |
| WO | WO 2012/062323 A2 | 5/2012 |
| WO | WO 2013/139375 A1 | 9/2013 |

OTHER PUBLICATIONS

International Search Report and Written Opinion, PCT/EP014/073155, Alstom Technology Ltd, 11 pages (dated Sep. 17, 2015).
English-language machine translation of CN 102545248A, Huazhong Univ. of Science & Technology, 12 pages. (Jul. 4, 2012).

* cited by examiner

POWER TRANSMISSION NETWORK

CROSS-REFERENCE TO RELATED APPLICATIONS

The present application is a National Stage of International Application No. PCT/EP2014/073155, filed Oct. 28, 2014, which claims the benefit of and priority to European Application No. 13275268, filed Oct. 29, 2013, which is incorporated herein by reference in its entirety.

This invention relates to a power transmission network.

In power transmission networks alternative current (AC) power is converted to direct current (DC) power for transmission via overhead lines and/or under-sea cables. This conversion to DC power removes the need to compensate for the AC capacitive load effects imposed by the power transmission medium, i.e. the transmission line or cable, and reduces the cost per kilometer of the lines and/or cables, and thus becomes cost-effective when power needs to be transmitted over a long distance. A converter, such as a voltage source converter, provides the required conversion between AC power and DC power within the network.

A typical such power transmission network includes a plurality of converters, each of which is connected on one side to a respective AC electrical network and is connected on the other side to a DC electrical network which interconnects it with one or more of the other converters.

According to a first aspect of the invention, there is provided a power transmission network comprising a plurality of converters, each converter including first and second electrical terminals, each first electrical terminal being connectable to an electrical network, each second electrical terminal being operatively connected to at least one other second electrical terminal, wherein at least one converter is designated as a first converter, at least one converter is designated as a second converter, at least one other converter is designated as a third converter, the or each first converter includes a first controller, the or each first controller being configured to selectively operate the or the respective first converter to modulate a power flow at its first or second electrical terminal, and the or each second converter includes a second controller, the or each second controller being configured to selectively operate the or the respective second converter to modulate a power flow at its second electrical terminal so as to generate a compensatory power to compensate for an imbalance in power within the power transmission network caused by the modulation of power flow by the or each first converter and thereby inhibit the modulation of power flow by the or each first converter from modifying a power flow in the or each third converter.

The power transmission network may be a DC power transmission network, e.g. a DC power grid or a multi-terminal DC electrical network. A multi-terminal DC electrical network may include a plurality of DC terminals, each DC terminal being operatively connected to at least one other DC terminal, the second electrical terminal of each converter being connected to a respective one of the plurality of DC terminals.

It will be understood that the electrical network may be an AC or DC electrical network. Accordingly each converter may be a AC-AC, AC-DC or DC-DC converter.

Depending on the function of each converter (e.g. as a rectifier or inverter), one of the first and second electrical terminals of each converter operates as an input terminal while the other of the first and second electrical terminals of each converter operates as an output terminal. It will be understood that each converter can be operated to modulate a power flow at its input or output terminal, i.e. its first or second electrical terminal, The inclusion of the or each second controller in the power transmission network permits operation of the or each second converter to generate the compensatory power to restore a balance in power within the power transmission network when the or each first converter is operated to modulate a power flow at its first or second electrical terminal. Such operation of the or each second converter obviates the need to use the or each third converter (which is neither a first converter nor a second converter) to help generate the required compensatory power, thus enabling the modulation of power flow by the or each first converter to be inhibited from modifying the power flow in the or each third converter. This thereby enables the or each third converter to maintain its power exchange with the respective electrical network, thus resulting in a power transmission network that is capable of maintaining stable power transmission therein and in the associated electrical networks during modulation of power flow by the or each first converter.

In contrast, omission of the or each second controller from the power transmission network means that, when the or each first converter is operated to modulate a power flow at its first or second electrical terminal, all of the non-first converters in the power transmission network (including the or each third converter) is required to modulate a power flow at their respective second electrical terminals so as to maintain a balance in power within the power transmission network. This thereby results in modification of power flow in each of the non-first converters, thus modifying the power exchange between each of the non-first converters and the respective electrical network. Such modulation of power flow by all of the non-first converters in the power transmission network not only may adversely affect the stability of power transmission in the power transmission network and the associated electrical networks (especially if the or the respective electrical network connected to one or more of the non-first converters is not designed to cope with the resultant modification of power flow in the or each third converter, for instance, due to the susceptibility of the or the respective electrical network to one or more modulation frequencies) but also, in the case when the modulation of power flow by the or each first converter is reflected onto the or each corresponding electrical network through one or more non-first converters, weaken or reverse the net power modulation effect on the or each corresponding electrical network.

In addition, the ability to operate the or each second converter to transfer power and to modulate a power flow at its second electrical terminal so as to generate the compensatory power obviates the need for additional power modulation hardware (for instance an energy storage device) in the power transmission network.

Furthermore the inclusion of the or each second controller in the power transmission network permits optimisation of the power transmission network through selective designation of one or more converters as a second converter. At least one converter may be designated as a second converter in accordance with one or more requirements, such as:

susceptibility of the corresponding electrical network to modulation of power flow at a given frequency;
  converter rating;
  current operating point of the converter;
  electrical distance from the or each first converter.

Modulation of power flow by the or each first converter at its first or second electrical terminal may be carried out for various purposes, such as power oscillation damping.

In embodiments of the invention, the or each first controller may be configured to selectively operate the or the respective first converter to modulate a power flow at its first or second electrical terminal so as to damp at least one power oscillation in the or the respective electrical network. Such damping may be achieved by modulating a magnitude, frequency and/or phase of power flow at its first or second electrical terminal.

A power system is built out of a variety of power system components, such as generators, transmission lines and loads. Hence, there are many possible modes of interaction between the various power system components. Normally the power system is designed to be damped at a particular frequency of a given interaction between power system components. However, under certain circumstances, an interaction between power system components may not be damped, thus resulting in build-up of a power oscillation in the power system. A power oscillation is an oscillatory exchange in real power between active power system components of the power system.

The frequency of the power oscillation depends upon the mode of interaction. For interaction between individual generators or between groups of generators (i.e. local oscillations), the frequency of the power oscillation is typically in the region of 1-2 Hz. For interactions between large areas of the power system (i.e. inter-area oscillations), the frequency of the power oscillation is typically in the region of 0.1-1 Hz. For interactions between individual generators and other power controlling devices (i.e. sub-synchronous oscillations), the frequency of the power oscillation is typically in the region of 2-50 Hz or 2-60 Hz, depending on the nominal power system frequency. The other power controlling devices may be, for instance, active transmission line compensation devices.

The ability to operate the or each second converter to generate the compensatory power, as described above, not only enables any modulation of power flow by the or each first converter to damp at least one power oscillation in the or the respective electrical network to be inhibited from modifying a power flow in the or each third converter, but also minimises the impact on sections of the power transmission network that may be sensitive to frequencies associated with the power oscillation damping.

In further embodiments of the invention, at least two converters may be each designated as a second converter. In such embodiments, each second controller may be configured to selectively operate the respective second converter to modulate a power flow at its second electrical terminal so as to generate a respective portion of the compensatory power. Sharing the generation of the compensatory power between two or more second converters allows a higher degree of modulation of power flow by the or each first converter.

In still further embodiments of the invention, at least two converters may be each designated as both a first converter and a second converter. For example, one first converter may serve as a second converter with respect to another first converter and vice versa.

When modulation of power flow by at least two first converters is required, designating at least two converters each as both a first converter and a second converter may reduce the effect of the modulations of power flow by the first converters has on the balance in power within the power transmission network whilst reducing the power modulation requirement for the electrical networks respectively connected to the converters each designated as both a first converter and a second converter.

It will be appreciated that, in respect of a converter that is designated as both a first converter and a second converter, the first and second controllers may be kept distinct to each other, or may be integrated into a combined controller.

The first electrical terminals of multiple converters may be connectable to the same electrical network. The multiple converters with first electrical terminals connectable to the same electrical network may be designated to include at least one first converter and at least one second converter. The configuration of the power transmission network in this manner not only reduces the effect of the modulations of power flow by the or each first converter has on the balance in power within the power transmission network, but also may enhance the power modulation contribution to the corresponding electrical network and/or may reduce the power modulation requirement for the or each first converter.

At least one second converter may be operatively connected to an or a respective energy storage device. The second controller of the or each second converter operatively connected to the or the respective energy storage device may be configured to selectively operate the or the respective second converter to selectively store energy from or release energy to its second electrical terminal and thereby modulate a power flow at its second electrical terminal so as to generate at least part of the compensatory power.

An energy storage device may be designed to have a well damped, time-invariant characteristic within a given frequency range. Thus, operation of the or the respective second converter operatively connected to the or the respective energy storage device to selectively store energy from or release energy to its second electrical terminal and thereby modulate a power flow at its second electrical terminal further reduces the effect of the modulations of power flow by the or each first converter has on the balance in power within the power transmission network.

In embodiments of the invention, the first controller of at least one first converter may be configured to communicate a power modulation reference signal to the second controller of at least one second converter so as to coordinate the modulations of power flow by the first and second converters. For example, the first controller of at least one first converter may be configured to communicate a power modulation reference signal via a telecommunications link to the second controller of at least one second converter.

In further embodiments of the invention, the power transmission network may further include a power modulation reference signal controller configured to process at least one electrical measurement of the power transmission network (e.g. an electrical measurement at the first electrical terminal and/or second electrical terminal of any converter of the power transmission network and/or any other electrical terminal of the power transmission network) so as to generate a power modulation reference signal for operating the or the respective second converter.

The inclusion of the power modulation reference signal controller in the power transmission network obviates the need for communication of a power modulation reference signal from a first controller in order to enable the or the respective second converter to reliably modulate a power flow at its second electrical terminal so as to generate the compensatory power. Furthermore, if the or each electrical measurement of the power transmission network is a local electrical measurement of a second converter, the inclusion of the power modulation reference signal controller in the power transmission network obviates the need to transmit the or each electrical measurement (e.g. via a telecommunication link) to the second controller of the second converter in order to enable the second converter to reliably modulate a power flow at its second electrical terminal so as to generate the compensatory power.

The or each electrical measurement may be, but is not limited to, a DC voltage or current or power measurement, an AC voltage or current or power or phase angle measurement, a rate of change of a DC voltage or current or power measurement, or a rate of change of an AC voltage or current or power or phase angle measurement.

In still further embodiments of the invention, at least one second controller may be tuned in coordination with at least one first controller so as to coordinate the modulations of power flow by the corresponding first and second converters. Tuning of at least one first controller and at least one second controller in this manner enhances synchronisation of the modulations of power flow by the corresponding first and second converters and thereby improves the inhibition of the modulation of power flow by the or each first converter from modifying a power flow in the or each third converter.

It will be appreciated that, when a plurality of first controllers are employed in the power transmission network, each of the plurality of first controllers may be distinct to each first converter or may form part of a combined controller, e.g. a global controller for the power transmission network. Similarly, it will be appreciated that, when a plurality of second controllers are employed in the power transmission network, each of the plurality of second controllers may be distinct to each second converter or may form part of a combined controller, e.g. a global controller for the power transmission network.

According to a second aspect of the invention, there is provided a method of controlling a power transmission network, the power transmission network comprising a plurality of converters, each converter including first and second electrical terminals, each first electrical terminal being connectable to an electrical network, each second electrical terminal being operatively connected to at least one other second electrical terminal, the method comprising the steps of:
  (a) designating at least one converter as a first converter;
  (b) designating at least one converter as a second converter;
  (c) designating at least one other converter as a third converter;
  (d) operating the or the respective first converter to modulate a power flow at its first or second electrical terminal; and
  (e) operating the or the respective second converter to modulate a power flow at its second electrical terminal so as to generate a compensatory power to compensate for an imbalance in power within the power transmission network caused by the modulation of power flow by the or each first converter and thereby inhibit the modulation of power flow by the or each first converter from modifying a power flowing in the or each third converter.

The step of operating the or each first converter to modulate a power flow at its first or second electrical terminal may involve operating the or the respective first converter to modulate a power flow at its first or second electrical terminal so as to damp at least one power oscillation in the or the respective electrical network.

When the power transmission network includes at least two second converters, the method may further include the step of operating each of the second converters to modulate a power flow at its second electrical terminal so as to generate a respective portion of the compensatory power.

The method may further includes the step of designating at least two converters each as both a first converter and a second converter.

When the first electrical terminals of multiple converters are connectable to the same electrical network, the method may include the step of designating the multiple converters with first electrical terminals connectable to the same electrical network to include at least one first converter and at least one second converter.

When at least one second converter is operatively connected to an or a respective energy storage device, the method may include the step of operating the or each second converter operatively connected to the or the respective energy storage device to selectively store energy from or release energy to its second electrical terminal and thereby modulate a power flow at its second electrical terminal so as to generate at least part of the compensatory power.

Embodiments of the method according to the second aspect of the invention share the same advantages as the corresponding features of the power transmission network according to the first aspect of the invention.

A preferred embodiment of the invention will now be described, by way of a non-limiting example only, with reference to the accompanying drawings in which.

Figure 1:
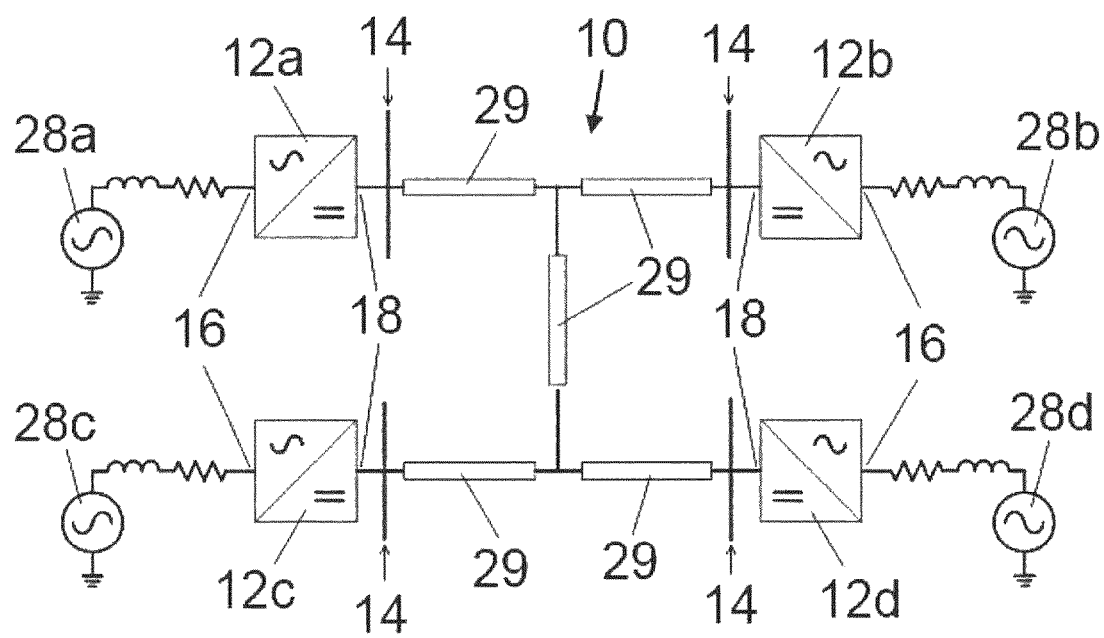
FIG. 1 shows, in schematic form, a power transmission network according to an embodiment of the invention.
Figure 4:
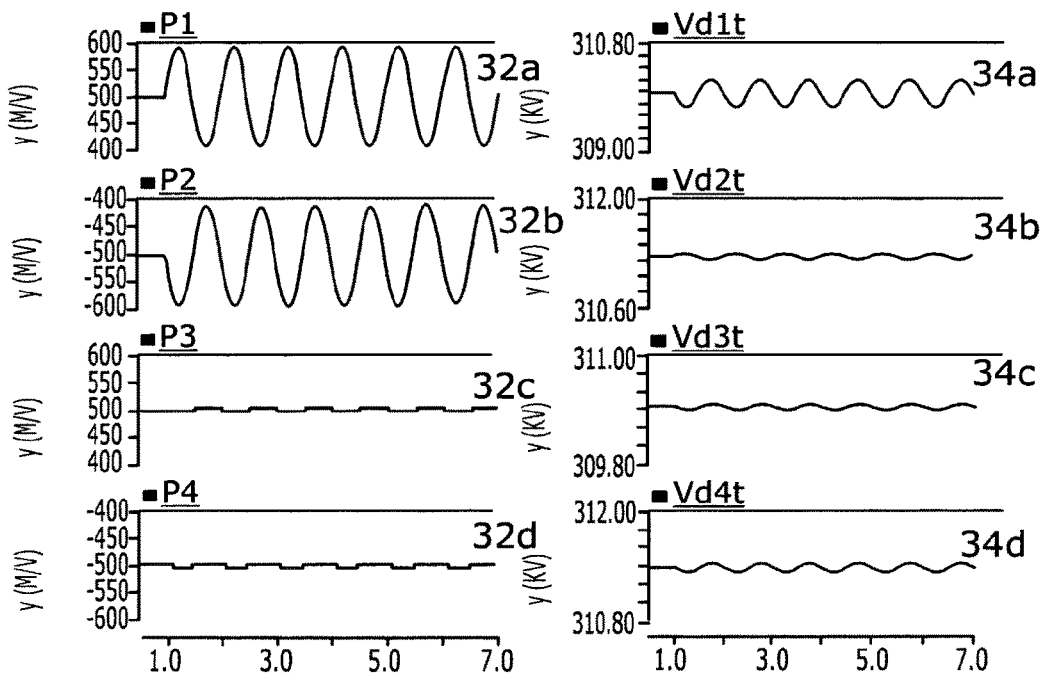
Figure 5:
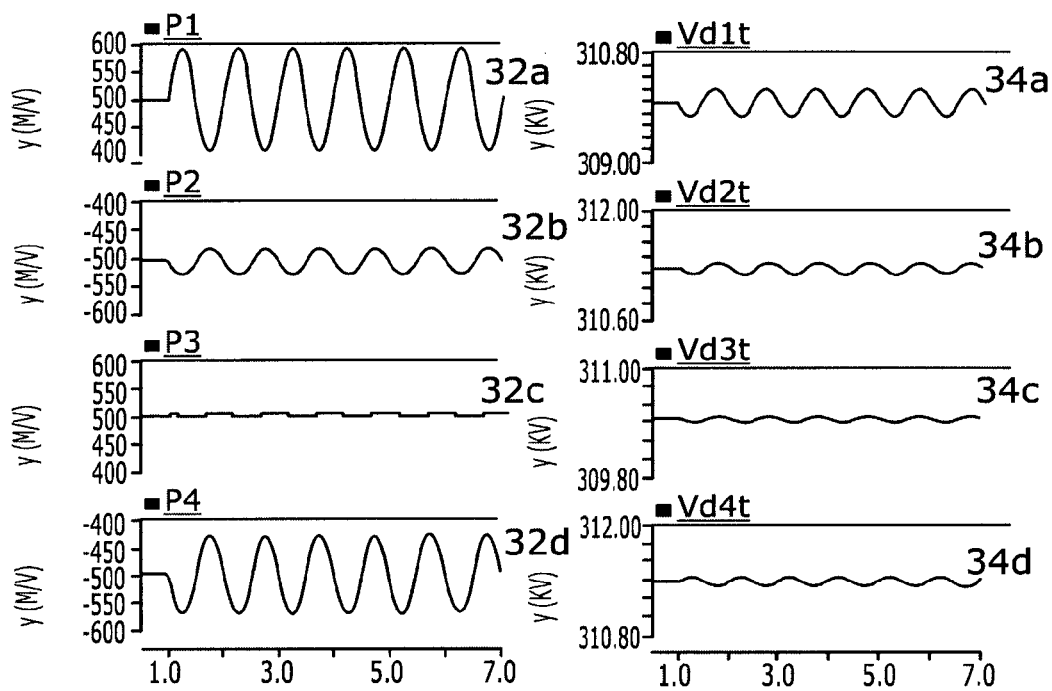

FIG. 4 illustrates, in graph form, DC powers and DC voltages of a plurality of converters forming part of the power transmission network of FIG. 1 when, at t=1 second, a first converter is operated to carry out a 100 MW modulation of power flow, and a second converter is operated to carry out a 100 MW modulation of power flow so as to generate a compensatory power; and FIG. 5 illustrates, in graph form, DC powers and DC voltages of a plurality of converters forming part of the power transmission network of FIG. 1 when, at t=1 second, a first converter is operated to carry out a 100 MW modulation of power flow, and second converters is operated to generate respective portions of a compensatory power in a 20% to 80% ratio.

A power transmission network 10 according to an embodiment of the invention is shown in FIG. 1.

The power transmission network 10 comprises a plurality of converters 12a, 12b, 12c, 12d and a plurality of DC terminal 14s.

Figure 2:
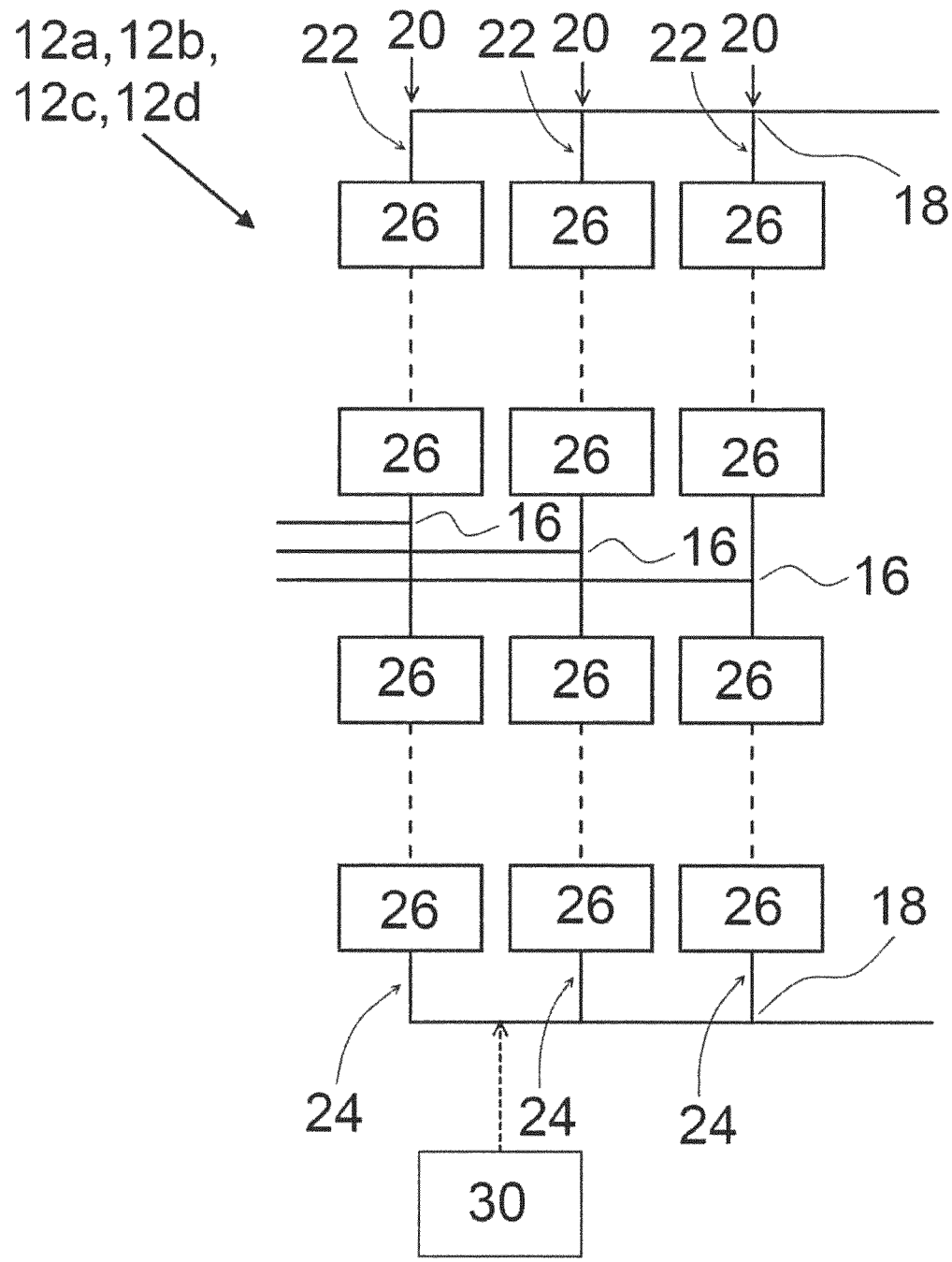
FIG. 2 shows, in schematic form, the structure of a converter forming part of the power transmission network of FIG. 1.

Each converter 12a, 12b, 12c, 12d includes first and second electrical terminals 16, 18 and a plurality of converter limbs 20, as shown in FIG. 2.

Each converter limb 20 extends between a pair of second electrical terminals 18. Each converter limb 20 has first and second limb portions 22, 24 separated by a respective first electrical terminal 16.

Each limb portion 22, 24 includes a plurality of series-connected switching elements 26. Each switching element 26 includes an active switching device that is connected in anti-parallel with a passive current check element.

Each active switching device is in the form of an insulated gate bipolar transistor (IGBT). It is envisaged that, in other embodiments of the invention, each IGBT may be replaced by a gate turn-off thyristor, a field effect transistor, an injection-enhanced gate transistor, an integrated gate commutated thyristor or any other self-commutated switching device. The number of active switching devices in each switching element 26 may vary depending on the required voltage rating of that switching element 26.

Each passive current check element includes a passive current check device in the form of a diode. It is envisaged that, in other embodiments, each diode may be replaced by any other device that is capable of limiting current flow in only one direction. The number of passive current check devices in each passive current check element may vary depending on the required voltage rating of that passive current check element.

In use, the first electrical terminals 16 of each converter 12a, 12b, 12c, 12d are respectively connected to a respective phase of a respective multi-phase AC electrical network 28a, 28b, 28c, 28d. The second electrical terminals 18 of each converter 12a, 12b, 12c, 12d are connected to a respective one of the plurality of DC terminals 14.

It will be appreciated that each AC electrical network 28a, 28b, 28c, 28d may be interconnected with or isolated from each other AC electrical network 28a, 28b, 28c, 28d.

It is envisaged that, in other embodiments of the invention, each first electrical terminal may be connected to a respective phase of a respective multi-phase AC electrical network via a transformer and/or any other passive element.

The power transmission network 10 further includes a plurality of transmission links 29 to interconnect the plurality of DC terminals 14, and thereby interconnect the second electrical terminals 18 of the plurality of converters 12a, 12b, 12c, 12d.

Each converter 12a, 12b, 12c, 12d includes a controller 30. Each controller 30 is configured to control switching of the corresponding switching elements 26 so as to operate the respective converter 12a, 12b, 12c, 12d.

Operation of the power transmission network 10 is described as follows, with reference to FIGS. 1 and 3 to 5.

Two of the converters 12a, 12c operate as inverters to export power from the power transmission network 10, while the remaining converters 12b, 12d operate as rectifiers to import power into the power transmission network 10. The respective operation of each converter 12a, 12b, 12c, 12d as an inverter or rectifier is carried out through control of the corresponding switching elements 26 by the respective controller 30. Each converter 12a, 12b, 12c, 12d is operated using a power reference of 500 MW. One converter 12a operates in a direct power control mode, and the remaining converters 12b, 12c, 12d operate in a voltage droop control mode.

As mentioned earlier, a power oscillation may arise in an AC electrical network 28a, 28b, 28c, 28d as a result of undamped interaction between various power system components of the AC electrical network 28a, 28b, 28c, 28d.

In event of a power oscillation in the AC electrical network 28a connected to the converter 12a operating in the direct power control mode, the converter 12a operating in the direct power control mode is designated as a first converter 12a, and its controller 30 is configured as a first controller 30. The first controller 30 is configured to selectively operate the first converter 12a to modulate a power flow at its first or second electrical terminals 16, 18 so as to damp the power oscillation in the corresponding AC electrical network 28a. Such damping may be achieved by modulating a magnitude, frequency and/or phase of power flow at its first or second electrical terminals 16, 18.

Modulation of power flow by the first converter 12a at its first or second electrical terminals 16, 18 causes an imbalance in power within the power transmission network 10.

Figure 3:
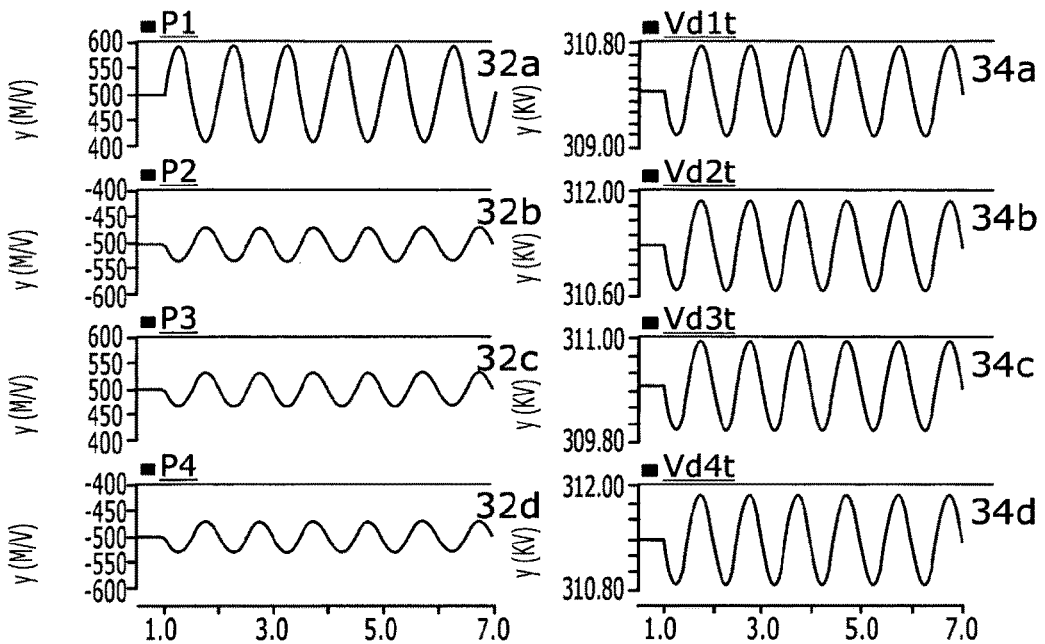
FIG. 3 illustrates, in graph form, DC powers and DC voltages of a plurality of converters forming part of the power transmission network of FIG. 1 when, at t=1 second, a first converter is operated to carry out a 100 MW modulation of power flow.

FIG. 3 illustrates, in graph form, DC powers 32a, 32b, 32c, 32d and DC voltages 34a, 34b, 34c, 34d of the plurality of converters 12a, 12b, 12c, 12d when, at t=1 second, the first converter 12a is operated to carry out a 100 MW modulation of power flow.

It will be appreciated that, in FIGS. 3 to 5, the DC power and DC voltage indicated by the reference numerals "32a" and "34a" corresponds to the converter indicated by the reference numeral "12a", the DC power and DC voltage indicated by the reference numerals "32b" and "34b" corresponds to the converter indicated by the reference numeral "12b", the DC power and DC voltage indicated by the reference numerals "32c" and "34c" corresponds to the converter indicated by the reference numeral "12c", the DC power and DC voltage indicated by the reference numerals "32d" and "34d" corresponds to the converter indicated by the reference numeral "12d".

It can be seen from FIG. 3 that all of the non-first converters 12b, 12c, 12d in the power transmission network 10 is required to modulate a power flow at their respective second electrical terminals 18 so as to maintain a balance in power within the power transmission network 10. This thereby results in modification of power flow in each of the non-first converters 12b, 12c, 12d, thus modifying the power exchange between each of the non-first converters 12b, 12c, 12d and the respective AC electrical network 28b, 28c, 28d. Such modulation of power flow by all of the non-first converters 12b, 12c, 12d in the power transmission network 10 may adversely affect the stability of power transmission in the power transmission network 10 and the associated AC electrical networks 28b, 28c, 28d (especially if the respective AC electrical network 28b, 28c, 28d connected to one or more of the non-first converters 12b, 12c, 12d is not designed to cope with the resultant modification of power flow in the corresponding non-first converter 12b, 12c, 12d, for instance, due to the susceptibility of the respective electrical network 28b, 28c, 28d to one or more modulation frequencies).

One way of improving stability of power transmission in the power transmission network 10 and the associated AC electrical networks 28a, 28b, 28c, 28d is by designating one of the non-first converters 12b, 12c, 12d as a second converter 12b and designating the other non-first converters 12c, 12d as a third converter 12c, 12d. The controller 30 of the second converter 12b is configured as a second controller 30. The second controller 30 is configured to selectively operate the second converter 12b to modulate a power flow at its second electrical terminals 18 so as to generate a compensatory power to compensate for an imbalance in power within the power transmission network 10 caused by the modulation of power flow by the first converter 12a.

The first controller 30 of the first converter 12a is configured to communicate a power modulation reference signal to the second controller 30 of the second converter 12b so as to coordinate the modulations of power flow by the first and second converters 12a, 12b. Since the frequency range associated with an AC electrical network 28a, 28b, 28c, 28d power oscillation is typically at hertz level, the first controller 30 is configured to communicate the power modulation reference signal via a telecommunications link to the second controller 30.

FIG. 4 illustrates, in graph form, DC powers 32a, 32b, 32c, 32d and DC voltages 34a, 34b, 34c, 34d of the plurality of converters 12a, 12b, 12c, 12d when, at t=1 second, the first converter 12a is operated to carry out a 100 MW modulation of power flow, and the second converter 12b is operated to carry out a 100 MW modulation of power flow so as to generate the compensatory power.

It can be seen from FIG. 4 that the ability to operate the second converter 12b to generate the compensatory power, as described above, not only allows the first converter 12a to readily carry out a modulation of power flow to damp a power oscillation in the corresponding AC electrical network 28a, but also inhibits the modulation of power flow by the first converter 12a from modifying a power flow in each third converter 12c, 12d. This is because the operation of the second converter 12b to generate the compensatory power restores a balance in power within the power transmission network 10 and thereby obviates the need to use each third converter 12c, 12d to help generate the required compensatory power. Hence, the ability to operate the second converter 12b to generate the compensatory power minimises the impact of the power oscillation damping on sections of the power transmission network 10 that are adjacent to each third converter 12c, 12d and on their corresponding AC electrical networks 28c, 28d that may be sensitive to frequencies associated with the power oscillation damping.

Another way of improving stability of power transmission in the power transmission network 10 and the associated AC electrical networks 28a, 28b, 28c, 28d is by designating two of the non-first converters 12b, 12d as a second converter 12b, 12d and designating the other non-first converter 12c as a third converter 12c. Each second controller 30 is configured to selectively operate the respective second converter 12b, 12d to modulate a power flow at its second electrical terminals 18 so as to generate a respective portion of the compensatory power to compensate for an imbalance in power within the power transmission network 10 caused by the modulation of power flow by the first converter 12a.

The first controller 30 of the first converter 12a is configured to communicate power modulation reference signals to the second controllers 30 of the second converters 12b, 12d in a 20% to 80% ratio so as to coordinate the modulations of power flow by the first and second converters 12a, 12b, 12d.

FIG. 5 illustrates, in graph form, DC powers 32a, 32b, 32c, 32d and DC voltages 34a, 34b, 34c, 34d of the plurality of converters 12a, 12b, 12c, 12d when, at t=1 second, the first converter 12a is operated to carry out a 100 MW modulation of power flow, and the second converters 12b, 12d is operated to generate the respective portions of the compensatory power in a 20% to 80% ratio.

It can be seen from FIG. 5 that the ability to operate the second converters 12b, 12d to generate the compensatory power, as described above, not only allows the first converter 12a to readily carry out a modulation of power flow to damp a power oscillation in the corresponding AC electrical network 28a, but also inhibits the modulation of power flow by the first converter 12a from modifying a power flow in the third converter 12c. This is because the operation of the second converters 12b, 12d to generate the compensatory power restores a balance in power within the power transmission network 10 and thereby obviates the need to use the third converter 12c to help generate the required compensatory power. Hence, the ability to operate the second converters 12b, 12d to generate the compensatory power minimises the impact of the power oscillation damping on sections of the power transmission network 10 that are adjacent to the third converter 12c and on its corresponding AC electrical network 28c that may be sensitive to frequencies associated with the power oscillation damping. Sharing the generation of the compensatory power between the two second converters 12b, 12d allows a higher degree of modulation of power flow modulation by the first converter 12a within the ratings of the second converters 12b, 12d.

It will be appreciated that the second converters 12b, 12d may be operated to generate the respective portions of the compensatory power in a ratio that is different from the aforementioned 20% to 80% ratio.

The inclusion of at least one second controller 30 in the power transmission network therefore results in a power transmission network 10 that is capable of maintaining stable power transmission therein and in the associated AC electrical networks 28a, 28b, 28c, 28d during modulation of power flow by the first converter 12a.

In addition, the ability to operate at least one second converter 12b, 12d to transfer power and to modulate a power flow at its second electrical terminals 18 so as to generate the compensatory power obviates the need for additional power modulation hardware (for instance an energy storage device) in the power transmission network 10.

Furthermore the inclusion of at least one second controller 30 in the power transmission network 10 permits optimisation of the power transmission network 10 through selective designation of one or more converters 12a, 12b, 12c, 12d as a second converter. At least one converter 12a, 12b, 12c, 12d may be designated as a second converter in accordance with one or more requirements, such as:

susceptibility of the corresponding AC electrical network 28a, 28b, 28c, 28d to modulation of power flow at a given frequency;

converter rating;

current operating point of the converter 12a, 12b, 12c, 12d;

electrical distance from the first converter.

Optionally at least two of the plurality of converters 12a, 12b, 12c, 12d may be each designated as both a first converter and a second converter. Such designation of at least two of the plurality of converters 12a, 12b, 12c, 12d may be carried out when the respective AC electrical networks 28a, 28b, 28c, 28d have different resonant frequencies.

Designating at least two converters 12a, 12b, 12c, 12d each as both a first converter and a second converter may reduce the effect of the modulations of power flow by the first converters has on the balance in power within the power transmission network 10 whilst reducing the power modulation requirement for the electrical networks respectively connected to the converters 12a, 12b, 12c, 12d each designated as both a first converter and a second converter.

It is envisaged that, in other embodiments of the invention, at least one second converter may be operatively connected to an or a respective energy storage device. The second controller of the or each second converter operatively connected to the or the respective energy storage device may be configured to selectively operate the or the respective second converter to selectively store energy from or release energy to its second electrical terminals and thereby modulate a power flow at its second electrical terminals so as to generate at least part of the compensatory power.

An energy storage device may be designed to have a well damped, time-invariant characteristic within a given frequency range, unlike an AC electrical network. Thus, operation of the or the respective second converter operatively connected to the or the respective energy storage device to selectively store energy from or release energy to its second electrical terminals and thereby modulate a power flow at its second electrical terminals further reduces the effect of the modulations of power flow by the or each first converter has on the balance in power within the power transmission network.

In still other embodiments of the invention, it is envisaged that, instead of communicating a power modulation reference signal from the first controller to the or each second controller, the power transmission network may include a power modulation reference signal controller configured to process at least one electrical measurement of the power transmission network (e.g. an electrical measurement at the first electrical terminals and/or second electrical terminals of any converter of the power transmission network and/or any other electrical terminal of the power transmission network) so as to generate a power modulation reference signal for operating the or the respective second converter.

The inclusion of the power modulation reference signal controller in the power transmission network obviates the need for communication of a power modulation reference signal from a first controller in order to enable the or the respective second converter to reliably modulate a power flow at its second electrical terminal so as to generate the compensatory power. Furthermore, if the or each electrical measurement of the power transmission network is a local electrical measurement of a second converter, the inclusion of the power modulation reference signal controller in the power transmission network obviates the need to transmit the or each electrical measurement (e.g. via a telecommunication link) to the second controller of the second converter in order to enable the second converter to reliably modulate a power flow at its second electrical terminal so as to generate the compensatory power.

The or each electrical measurement may be, but is not limited to, a DC voltage or current or power measurement, an AC voltage or current or power or phase angle measurement, a rate of change of a DC voltage or current or power measurement, or a rate of change of an AC voltage or current or power or phase angle measurement.

Preferably at least one second controller may be tuned in coordination with the first controller so as to coordinate the modulations of power flow by the corresponding first and second converters. Tuning of the first controller and at least one second controller in this manner enhances synchronisation of the modulations of power flow by the corresponding first and second converters and thereby improves the inhibition of the modulation of power flow by the first converter from modifying a power flow in the or each third converter.

Whilst the embodiment shown in FIG. 1 is primarily described with reference to the use of modulation of power flow by the first converter 12a to damp a power oscillation in an AC electrical network 28a, it will be appreciated that the operation of the embodiment of FIG. 1 may be carried out in respect of modulation of power flow by the first converter 12a for other purposes, such as optimising power flow quality.

It will be appreciated that the properties of each converter 12a, 12b, 12c, 12d and the power transmission network 10 are merely chosen to help illustrate the operation of the invention, and may vary depending on the requirements of the associated power application.

It will be appreciated that the above-described designation of a specific converter 12a, 12b, 12c, 12d as a first, second or third converter is merely to help illustrate the operation of the invention, and each converter 12a, 12b, 12c, 12d may be designated as a first, second or third converter depending on the requirements of the associated power application.

It will be further appreciated that the topology of each converter 12a, 12b, 12c, 12d and the 3o power transmission network 10 is merely chosen to help illustrate the operation of the invention, and that each converter 12a, 12b, 12c, 12d and the power transmission network 10 may be respectively replaced by another converter with a different topology and by another power transmission network with a different topology.

For example, the power transmission network may include multiple converters with first electrical terminals connectable to the same AC electrical network.

When the multiple converters with first electrical terminals connectable to the same AC electrical network includes at least one first converter, the ability to operate the or each second converter to generate the compensatory power, as described above, minimises any reflection of the modulation of power flow by the or each first converter onto the AC electrical network through one or more non-first converters also forming part of the multiple converters with first electrical terminals connectable to the same AC electrical network, thus preventing a weakening or reversal of the net damping effect on the AC electrical network.

The multiple converters with first electrical terminals connectable to the same AC electrical network may be designated to include at least one first converter and at least one second converter. The configuration of the power transmission network in this manner not only reduces the effect of the modulations of power flow by the or each first converter has on the balance in power within the power transmission network, but also may enhance the power modulation contribution to the corresponding electrical network and/or may reduce the power modulation requirement for the or each first converter for a given power oscillation damping performance.

It is envisaged that, in other embodiments of the invention, the electrical terminals and switching elements of each converter may be rearranged to configure that converter as an AC-AC or DC-DC converter.

The number of converter limbs in each converter may vary from depending on the number of phases in the respective AC electrical network to which each converter is connected.

The invention claimed is:

1. A power transmission network comprising a plurality of converters, each converter including first and second electrical terminals, each first electrical terminal being connectable to an electrical network, each second electrical terminal being operatively connected to at least one other second electrical terminal, wherein at least one converter is designated as a first converter, at least one converter is designated as a second converter, at least one other converter is designated as a third converter, the, or each, first converter includes a first controller, the, or each, first controller being configured to selectively operate the, or the respective, first converter to modulate a power flow at the first or second electrical terminal of the, or each, first converter, and the, or each, second converter includes a second controller, the, or each, second controller being configured to selectively operate the, or the respective, second converter to modulate a power flow at the second electrical terminal of the, or the respective, second converter so as to generate a compensatory power to compensate for an imbalance in power within the power transmission network caused by the modulation of power flow by the, or each, first converter and thereby inhibit the modulation of power flow by the, or each, first converter from modifying a power flow in the, or each, third converter.

2. The power transmission network according to claim 1 wherein the, or each, first controller is configured to selectively operate the, or the respective, first converter to modulate a power flow at the first or second electrical terminal of the, or the respective, first converter so as to damp at least one power oscillation in the or the respective electrical network.

3. The power transmission network according to claim 1 wherein at least two converters are each designated as a second converter, and each second controller is configured to selectively operate a respective second converter to modulate a power flow at the second electrical terminal of the respective second converter so as to generate a respective portion of the compensatory power.

4. The power transmission network according to claim 1 wherein at least two of the plurality of converters are each designated as both the first converter and the second converter.

5. The power transmission network according to claim 1 wherein the first electrical terminals of multiple converters are connectable to a common electrical network, and the multiple converters with first electrical terminals connectable to the common electrical network are designated to include at least one converter designated as a first converter and at least one converter designated as a second converter.

6. The power transmission network according to claim 1 wherein at least one second converter is operatively connected to an, or a respective energy storage device, and the second controller of the, or each second converter operatively connected to the, or the respective energy storage device is configured to selectively operate the, or the respective, second converter to selectively store energy from or release energy to the second electrical terminal of the, or the respective, second converter and thereby modulate a power flow at the second electrical terminal so as to generate at least part of the compensatory power.

7. The power transmission network according to claim 1 wherein the first controller of at least one first converter is configured to communicate a power modulation reference signal to the second controller of at least one second converter so as to coordinate the modulations of power flow by the first and second converters.

8. The power transmission network according to claim 1 further including a power reference modulation signal controller configured to process at least one electrical measurement of the power transmission network so as to generate a power modulation reference signal for operating the, or the respective, second converter.

9. The power transmission network according to claim 1 wherein at least one second controller is tuned in coordination with at least one first controller so as to coordinate the modulations of power flow by the corresponding first and second converters.

10. A method of controlling a power transmission network, the power transmission network comprising a plurality of converters, each converter including first and second electrical terminals, each first electrical terminal being connectable to an electrical network, each second electrical terminal being operatively connected to at least one other second electrical terminal, the method comprising the steps of:
(a) designating at least one converter as a first converter;
(b) designating at least one converter as a second converter;
(c) designating at least one other converter as a third converter;
(d) operating the or the respective first converter to modulate a power flow at its first or second electrical terminal; and
(e) operating the, or the respective, second converter to modulate a power flow at the second electrical terminal of the, or the respective, second converter so as to generate a compensatory power to compensate for an imbalance in power within the power transmission network caused by the modulation of power flow by the, or each, first converter and thereby inhibit the modulation of power flow by the, or each, first converter from modifying a power flowing in the, or each, third converter.

11. The method according to claim 10 wherein the step of operating the or each first converter to modulate a power flow at its first or second electrical terminal involves operating the, or the respective, first converter to modulate a power flow at the first or second electrical terminal of the first converter so as to damp at least one power oscillation in the, or the respective, electrical network.

12. The method according to claim 10 wherein the power transmission network includes at least two second converters, the method further including the step of operating each of the second converters to modulate a power flow at the second electrical terminal of each of the second converters so as to generate a respective portion of the compensatory power.

13. The method according to claim 10 further including the step of designating at least two of the plurality of converters each as both the first converter and the second converter.

14. The method according to claim 10 wherein the first electrical terminals of multiple converters are connectable to a common electrical network, the method including the step of designating the multiple converters with first electrical terminals connectable to the common electrical network to include at least one first converter and at least one second converter.

15. The method according to claim 10 wherein at least one second converter is operatively connected to an or a respective energy storage device, the method including the step of operating the, or each, second converter operatively connected to the, or the respective, energy storage device to selectively store energy from or release energy to the second electrical terminal of the, or each, second converter and thereby modulate a power flow at its second electrical terminal so as to generate at least part of the compensatory power.

* * * * *